US011364435B2

(12) United States Patent
Endo et al.

(10) Patent No.: US 11,364,435 B2
(45) Date of Patent: Jun. 21, 2022

(54) OPERATION DEVICE

(71) Applicant: ALPS ALPINE CO., LTD., Tokyo (JP)

(72) Inventors: Tomoya Endo, Miyagi (JP); Makoto Hayashi, Miyagi (JP); Tatsuaki Kawase, Miyagi (JP); Nobuyuki Ninomiya, Miyagi (JP); Tomoyasu Nagano, Miyagi (JP); Hidekazu Kato, Miyagi (JP); Shuji Fujiwara, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/302,098

(22) Filed: Apr. 23, 2021

(65) Prior Publication Data

US 2021/0236919 A1     Aug. 5, 2021

Related U.S. Application Data

(63) Continuation of application No. PCT/JP2019/043506, filed on Nov. 6, 2019.

(30) Foreign Application Priority Data

Nov. 20, 2018 (JP) .............................. JP2018-217004

(51) Int. Cl.
*A63F 13/24* (2014.01)
(52) U.S. Cl.
CPC ................................... *A63F 13/24* (2014.09)
(58) Field of Classification Search
None
See application file for complete search history.

(56) References Cited

U.S. PATENT DOCUMENTS 6,002,351 A * 12/1999 Takeda .................. G05G 9/047
  341/20
10,020,137 B2    7/2018 Shitanaka et al.
(Continued)

FOREIGN PATENT DOCUMENTS

JP            3066234 U      2/2000
JP         2002-169654       6/2002
(Continued)

OTHER PUBLICATIONS

International Search Report for PCT/JP2019/043506 dated Dec. 17, 2019.

*Primary Examiner* — Tramar Harper
(74) *Attorney, Agent, or Firm* — IPUSA, PLLC

(57) ABSTRACT

An operation device includes a housing, a tiltable cylindrical operation member having a step portion on an inner circumferential surface, a first holding member which is held by the housing and rotatable in a first direction in accordance with a tilting operation of the operation member, a first detecting portion for detecting a rotation of the first holding member, and a returning mechanism disposed inside the operation member to return the tilted operation member to an initial position, wherein the returning mechanism includes an actuator, a slide member having a first cam surface at one end, a cam member having a second cam surface at one end which faces the first cam surface, a first elastic member, and a second elastic member.

7 Claims, 10 Drawing Sheets

(56) References Cited

U.S. PATENT DOCUMENTS

| | | | |
|---|---|---|---|
| 10,229,797 B2 | 3/2019 | Yoshida et al. | |
| 2004/0095320 A1* | 5/2004 | Furukawa | G05G 9/047 345/161 |
| 2005/0057502 A1* | 3/2005 | Arneson | H04M 1/233 345/161 |
| 2005/0190153 A1* | 9/2005 | Ushimaru | G05G 9/04796 345/161 |
| 2006/0137964 A1 | 6/2006 | Liu | |
| 2009/0295724 A1* | 12/2009 | Cheng | G05G 9/047 345/161 |
| 2012/0274563 A1* | 11/2012 | Olsson | G05G 9/047 345/161 |
| 2017/0001106 A1* | 1/2017 | Gassoway | G05G 9/047 |
| 2018/0174783 A1* | 6/2018 | Wu | G05G 9/047 |
| 2018/0200617 A1* | 7/2018 | Tiffany | A63F 13/24 |

FOREIGN PATENT DOCUMENTS

| | | |
|---|---|---|
| JP | 2007-059161 | 3/2007 |
| JP | 2012-089253 | 5/2012 |
| JP | 2017-152145 | 8/2017 |
| WO | 2015/159494 | 10/2015 |

* cited by examiner

FIG.4
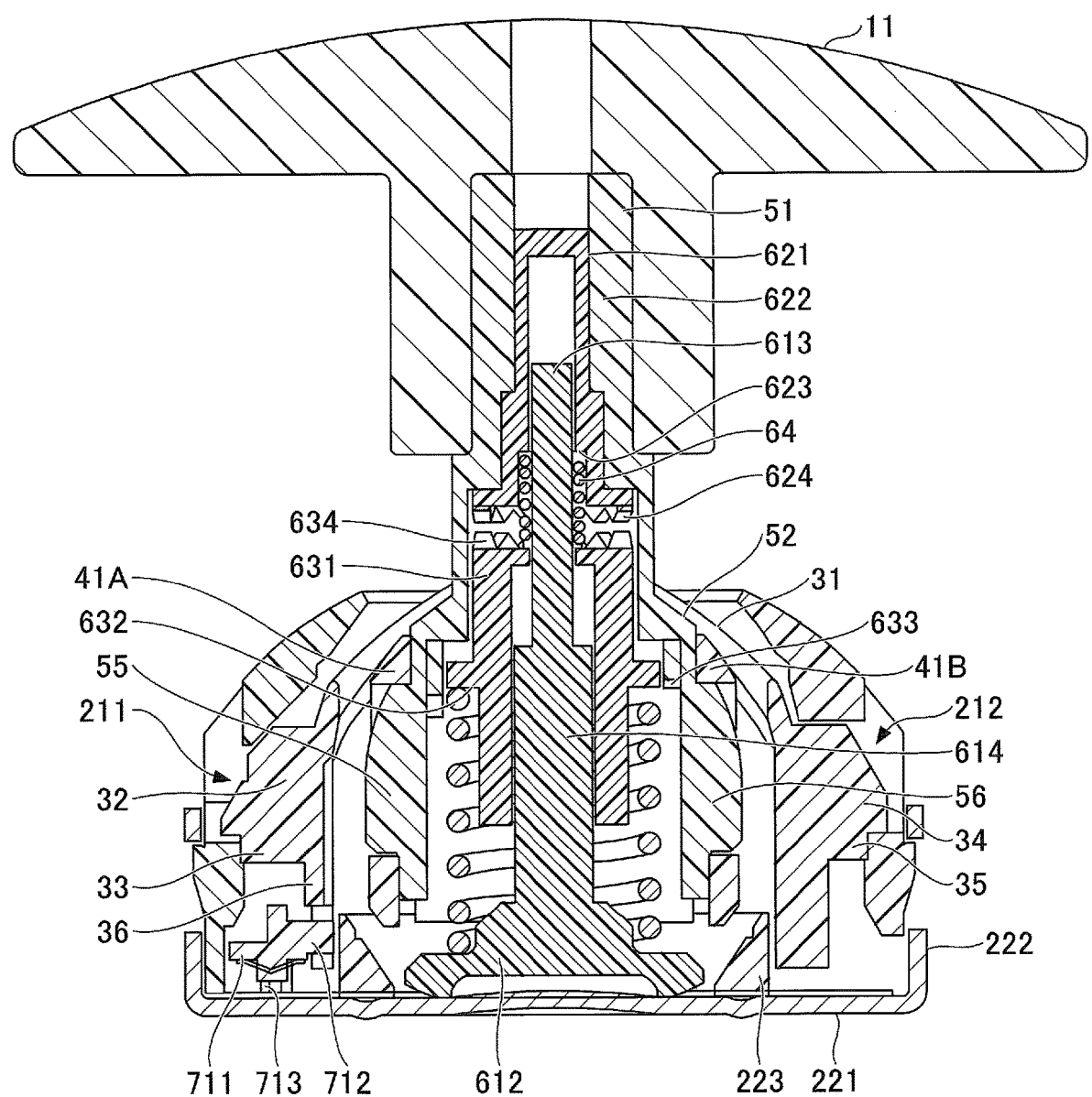
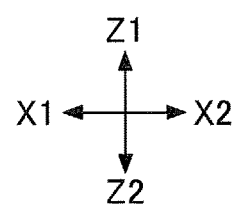

OPERATION DEVICE

CROSS-REFERENCE TO RELATED APPLICATION

This U.S. non-provisional application is a continuation of PCT International Application PCT/JP2019/043506 filed on Nov. 6, 2019 and designated the U.S., which is based upon and claims priority to Japanese Patent Application No. 2018-217004 filed on Nov. 20, 2018, with the Japan Patent Office. The entire contents of these applications are incorporated herein by reference.

BACKGROUND OF THE INVENTION

1. Field of the Invention

The present invention relates to an operation device.

2. Description of the Related Art

Conventionally, as a controller of a home game machine, an operation device capable of tilting an operation member, such as a joystick, in a plurality of directions is used. This type of operation device is provided with a returning mechanism to preload the tilted operation member toward the initial position and to automatically return the operation member to the initial position. A user tilts the operation member against the force applied by the returning mechanism to the operation member (shaft actuation torque, hereinafter referred to as "actuation force"). The greater the actuation force, the greater the force is required to operate the operation member at a predetermined angle.

RELATED-ART DOCUMENT

Patent Documents

Patent Document 1: PCT International Publication No. WO 2015/159494

SUMMARY OF THE INVENTION

Problems to be Solved by the Invention

The actuation force of the operation device is preferably smaller when the operation member is operated quickly, and the actuation force of the operation device is preferably larger when the operation member is used for fine work. Further, the actuation force of the operation device is preferably smaller when a user is tired. In this manner, the preferred actuation force varies depending upon the circumstances in which the operation device is utilized and the state of the user. However, in conventional operation devices, the actuation force was predetermined by design, so the user could not adjust the actuation force.

An object of the present invention is to provide an operation device that allows a user to adjust an actuation force.

Means for Solving the Problems

An operation device includes a housing; a tiltable cylindrical operation member having a step portion on an inner circumferential surface; a first holding member which is held by the housing and rotatable in a first direction in accordance with a tilting operation of the operation member; a first detecting portion for detecting a rotation of the first holding member; and a returning mechanism disposed inside the operation member to return the tilted operation member to an initial position, wherein the returning mechanism includes: an actuator having a shaft portion extending in an axial direction of the operation member, and a bottom portion that is formed at one end of the shaft portion and abuts a bottom surface of the housing; a slide member having a first cam surface at one end, wherein one end of the shaft portion is inserted into the slide member, the slide member being movable in the axial direction and fixed in a circumferential direction of the operation member; a cam member having a second cam surface at one end which faces the first cam surface, wherein a center portion of the shaft portion is inserted into the cam member, and the cam member is movable in the axial direction and fixed in the circumferential direction by the step portion, and wherein the cam member is preloaded in the circumferential direction by contact between the first cam surface and the second cam surface; a first elastic member disposed between the slide member and the cam member, and a second elastic member disposed between the cam member and the bottom portion.

Advantageous Effects of the Invention

According to embodiments of the present invention, an operation device that allows the user to adjust the actuation force can be provided.

BRIEF DESCRIPTION OF THE DRAWINGS

FIG. 4 is a cross-sectional view taken along the line B-B of the operation device illustrated in FIG. 1.

DETAILED DESCRIPTION OF THE PREFERRED EMBODIMENTS

Figure 1:
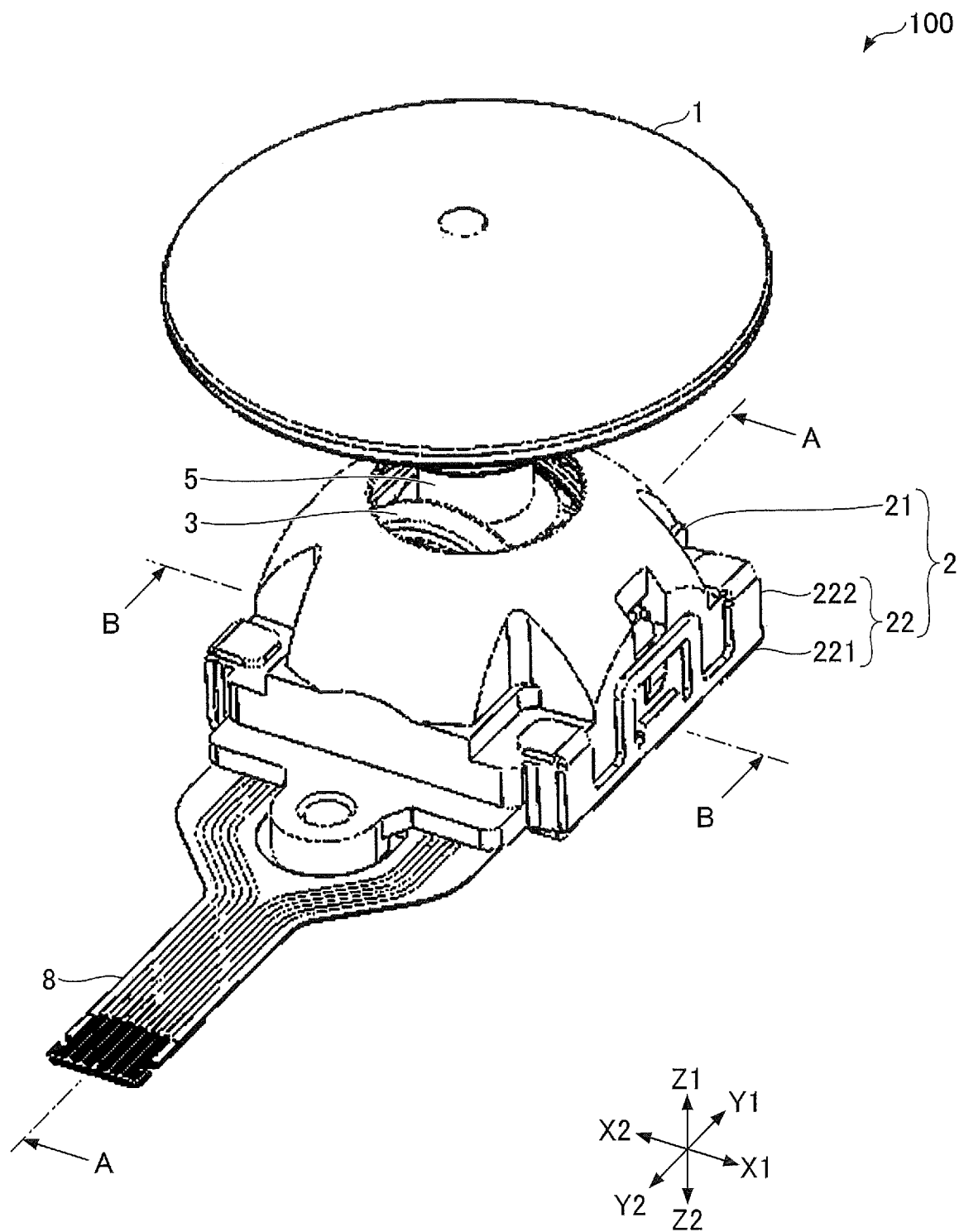
FIG. 1 is a perspective view illustrating an example of an operation device according to an embodiment.

Hereinafter, each embodiment of the present invention will be described with reference to the accompanying drawings. With regard to the description and drawings in accordance with each embodiment, for the components having substantially the same functional configuration, the overlapping description is omitted by giving the same reference numerals.

An operation device 100 according to an embodiment will be described with reference to FIGS. 1 to 10. The operation device 100 according to the present embodiment includes an operation member capable of tilting operation and a returning mechanism for automatically returning the tilted operation member to the initial position, and the operation device 100 is an operation device in which a user can adjust an actuator force of the returning mechanism by a knock mechanism. The operation device 100 may be used as a controller, for example, a home game machine or a radio controller, but the application of the operation device 100 is not limited thereto.

Figure 2:
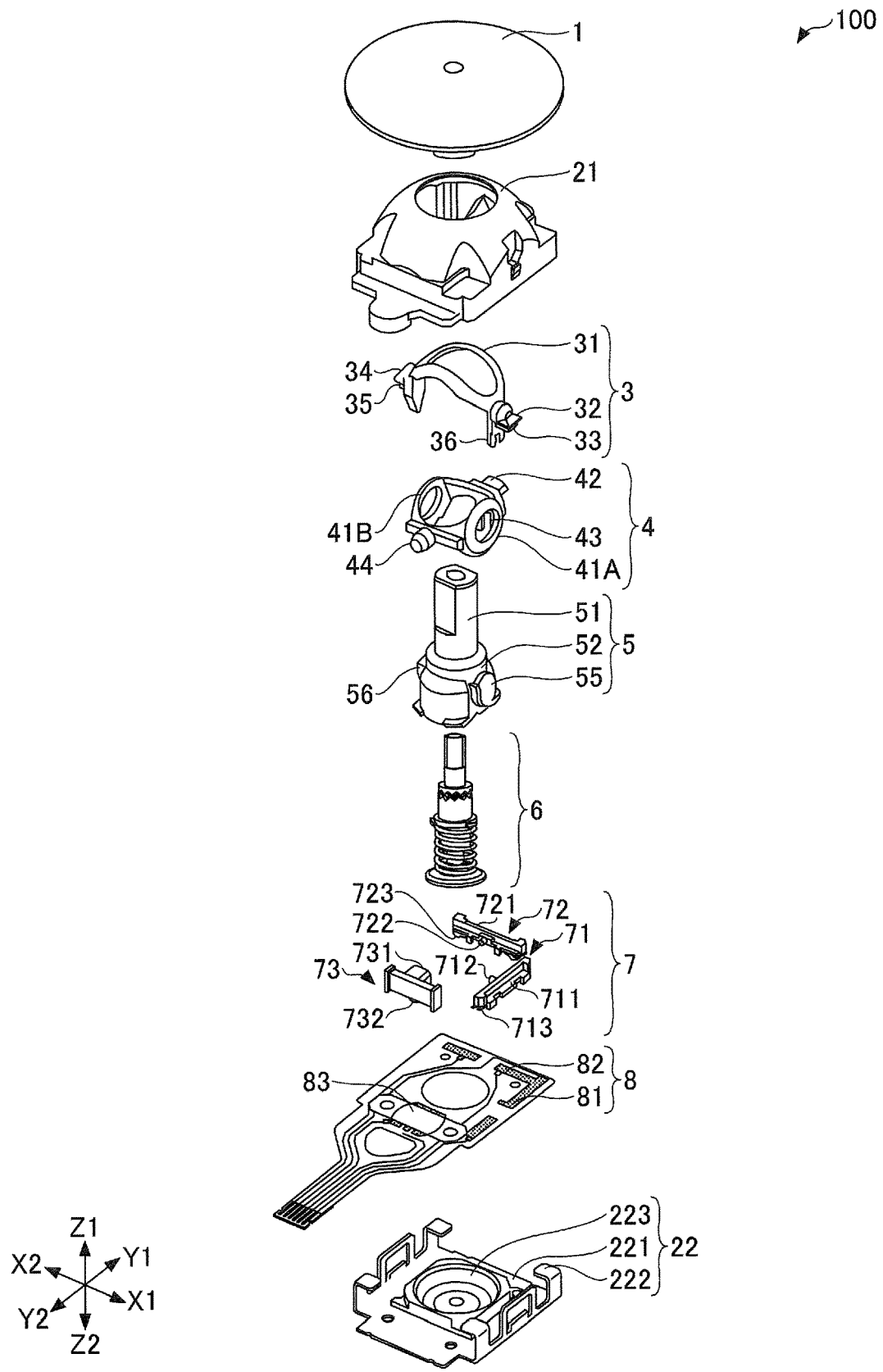
FIG. 2 is an exploded perspective view of the operation device illustrated in FIG. 1.
Figure 3:
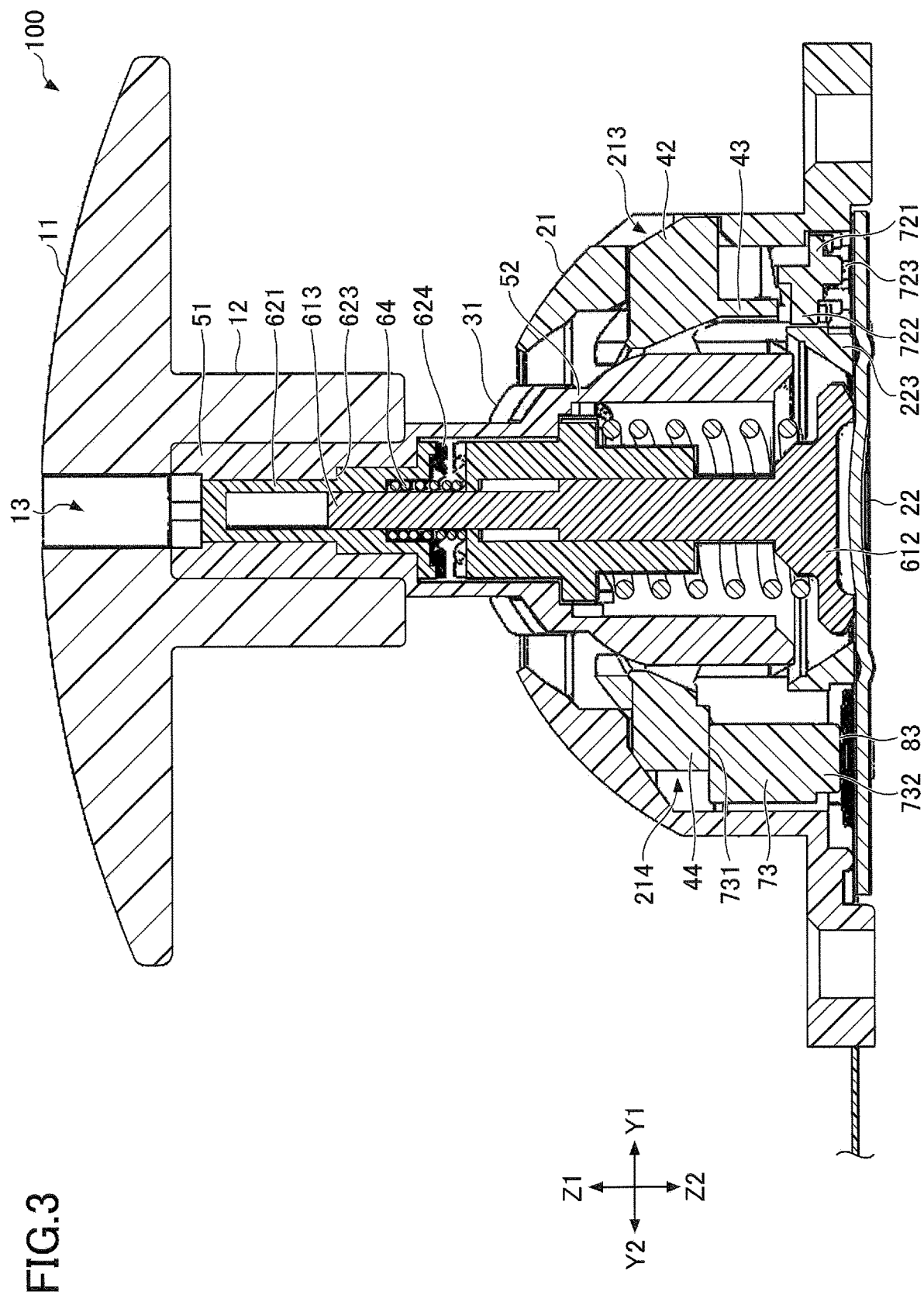
FIG. 3 is a cross-sectional view taken along the line A-A of the operation device illustrated in FIG. 1.
Figure 5:
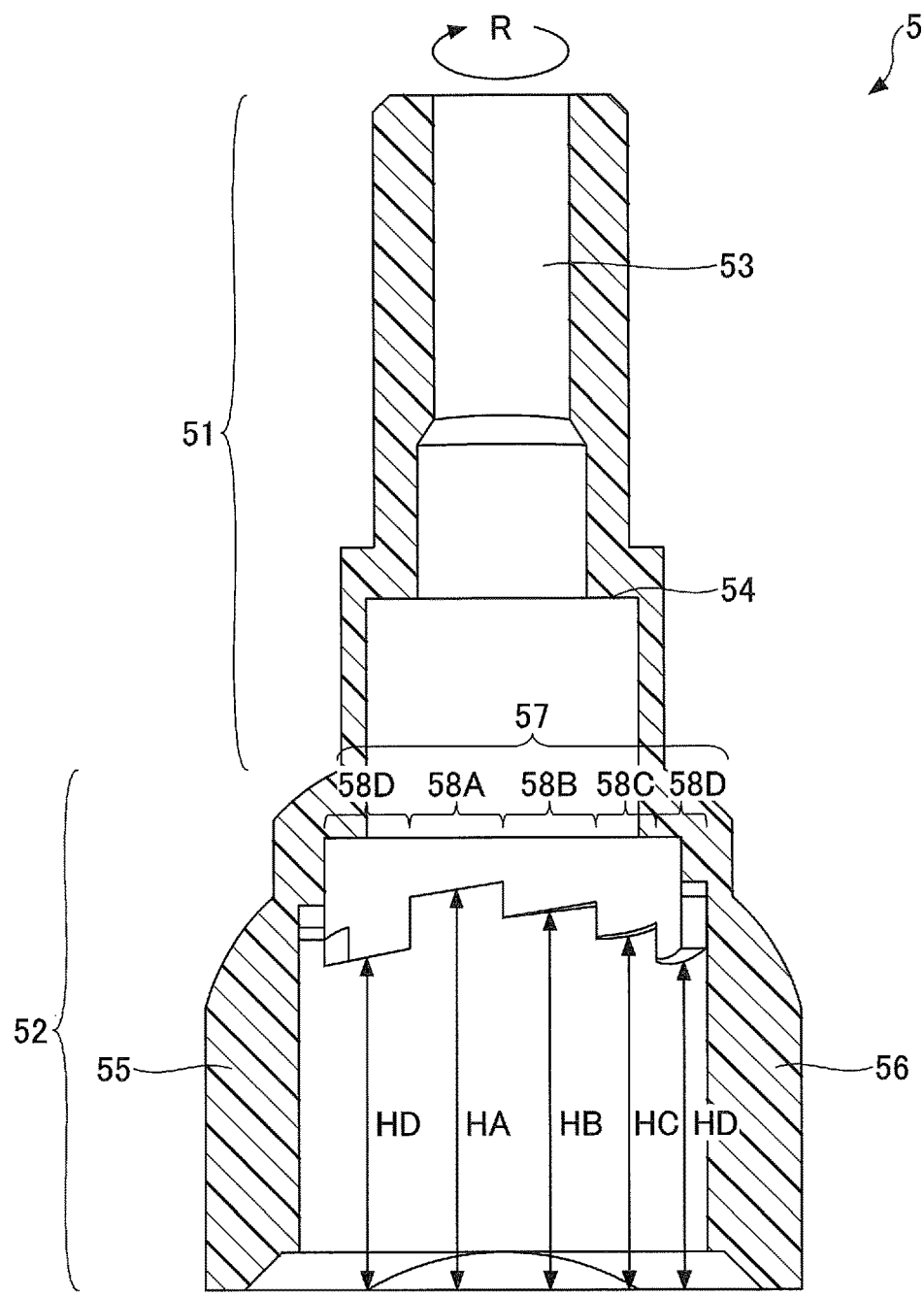
FIG. 5 is a cross-sectional view taken along the line B-B of the operation member illustrated in FIG. 1.
Figure 6:
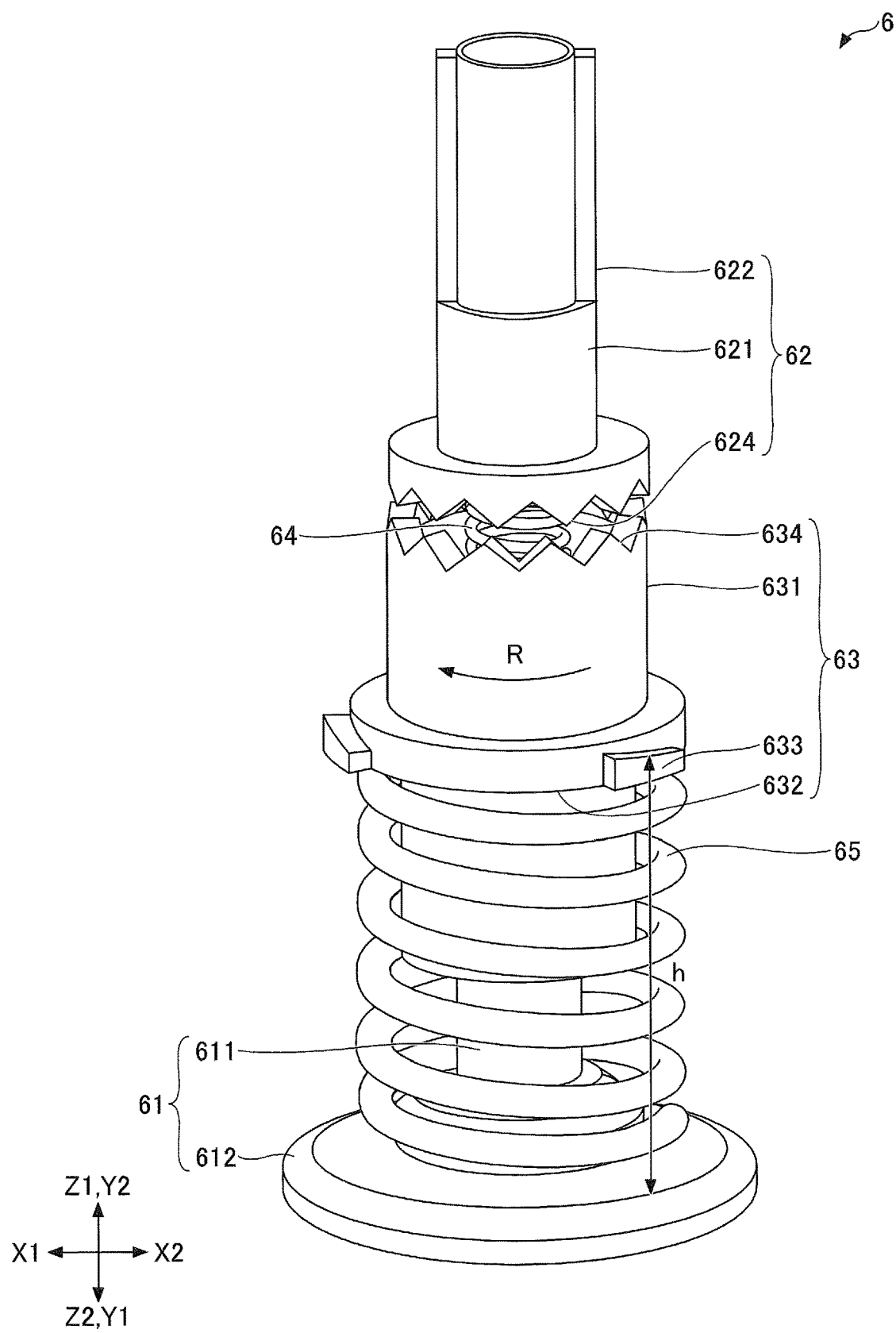
FIG. 6 is a perspective view of a returning mechanism illustrated in FIG. 1.
Figure 7:
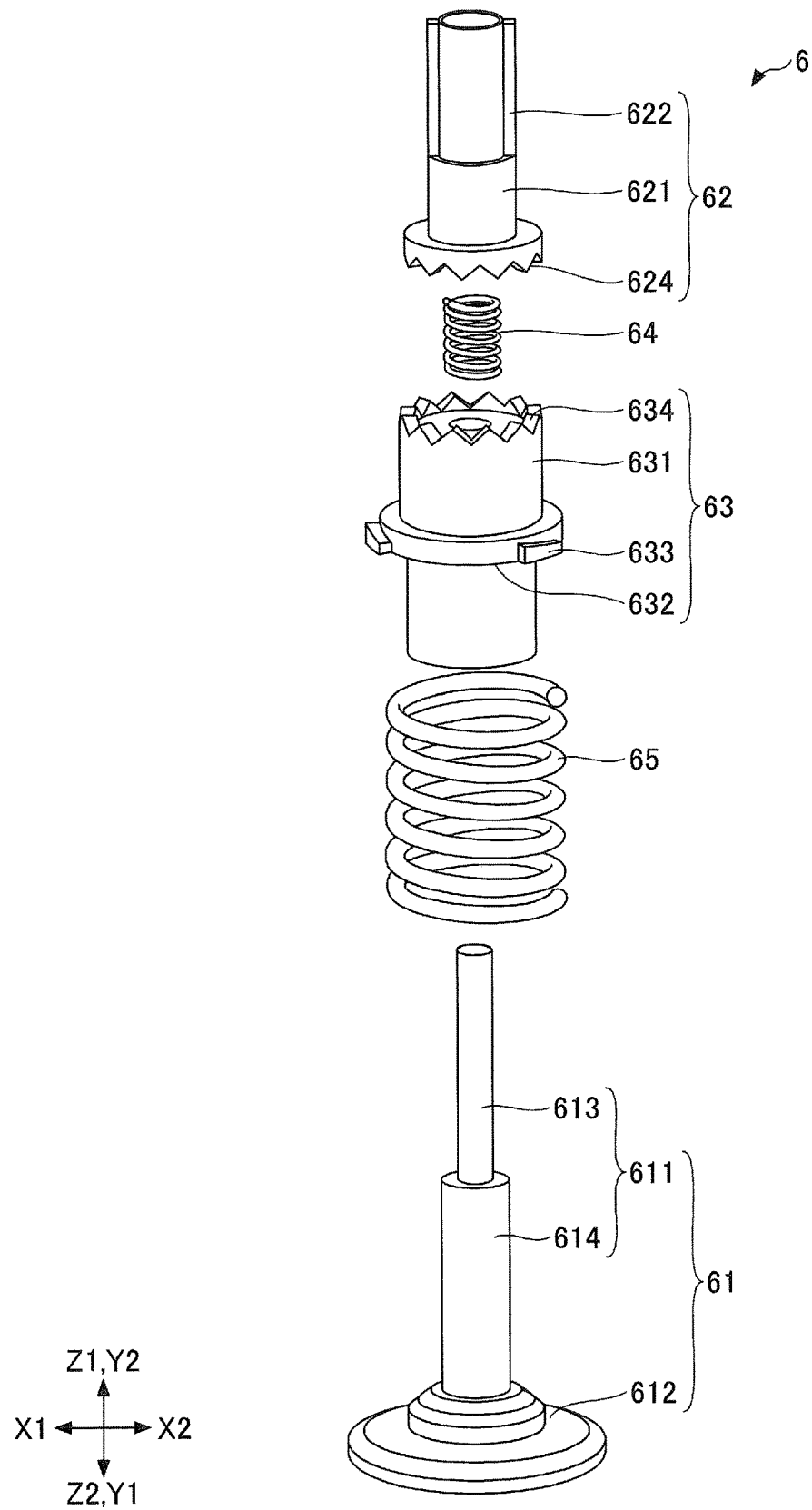
FIG. 7 is an exploded perspective view of the returning mechanism illustrated in FIG. 1.

FIG. 1 is a perspective view illustrating an example of the operation device 100 according to the present embodiment. FIG. 2 is an exploded perspective view of the operation device 100 illustrated in FIG. 1. FIG. 3 is a cross-sectional view taken along the line A-A of the operation device 100 illustrated in FIG. 1. FIG. 4 is a cross-sectional view taken along the line B-B of the operation device 100 illustrated in FIG. 1. FIG. 5 is a cross-sectional view taken along the line B-B of the operation member 5 illustrated in FIG. 1. FIG. 6 is a perspective view of a returning mechanism 6 illustrated in FIG. 1. FIG. 7 is an exploded perspective view of the returning mechanism 6 illustrated in FIG. 6.

Hereinafter, the operation device 100 will be described with reference to the direction (X1, X2, Y1, Y2, Z1, and Z2) illustrated in the drawings. The X1 and X2-directions are collectively referred to as the X-direction, the Y1 and Y2-directions are collectively referred to as the Y-direction, and the Z1 and Z2-directions are collectively referred to as the Z-direction. The Z1-direction and the Z2-direction may be referred to as the upward direction and the downward direction, respectively. The X, Y, and Z-directions are orthogonal to each other.

As illustrated in FIGS. 1 to 7, the operation device 100 includes an operation knob 1, a housing 2, a first holding member 3, a second holding member 4, an operation member 5, a returning mechanism 6, a detecting mechanism 7, and a substrate 8.

The operation knob 1 is a member that directly receives an operation from a user. The operation knob 1 is formed of, for example, a resin or rubber. The operation knob 1 includes an operation portion 11 and a connection portion 12.

The operation portion 11 is a portion which directly accepts the operation from a user. In the example illustrated in FIG. 1, the operation portion 11 in the XY plane view has a circular shape, a convex surface in the upper surface, and a flat surface in the lower surface. The shape of the operation portion 11 is not limited thereto. The operation portion 11 may have any shape which the user can easily operate with fingers.

The operation portion 11 has a through-hole 13 which passes from the upper surface to the lower surface. A push-button is inserted into the through-hole 13 so that the upper end protrudes from the upper surface of the operation portion 11, which is not illustrated in the drawings. The user presses the push-button to press a slide member 62, which will be described later, thereby the user adjusts the actuator force by the returning mechanism 6.

The connection portion 12 connects the operation knob 1 to the operation member 5. The connection portion 12 is formed in a cylindrical shape extending vertically from the lower surface of the operation portion 11. The operation knob 1 and the operation member 5 are connected by inserting the upper end of the operation member 5 inside the connection portion 12. The connection portion 12 is formed so as to face the lower opening portion of the through-hole 13 and the upper opening portion of the operation member 5. Specifically, the connection portion 12 is formed to include the lower opening portions of the through-hole 13 therein. Thus, the through-hole 13 is connected to the inside of the operation member 5, and the push-button described above can be disposed so that the lower end thereof is in contact with the upper end of the slide member 62.

The configuration of the operation knob 1 is not limited to the example illustrated in the drawings. The operation knob 1 can be any configuration in which an operation from a user can be received. The operation knob 1 may be formed integrally with the operation member 5 or may be secured by a method such as screws or adhesion.

The housing 2 is a member that houses each configuration of the operation device 100. The housing 2 includes a case 21 and a frame 22.

The case 21 is a member that forms the upper portion of the housing 2. The case 21 is formed of, for example, a resin. The case 21 is hollow dome-shaped and secures the lower surface of the case 21 to the upper surface of the frame 22. As illustrated in FIGS. 3 and 4, the case 21 has bearing portions 211 to 214.

The bearing portion 211 is a portion of the first holding member 3 that holds a shaft portion 32, which will be described later. As illustrated in FIG. 4, the bearing portion 211 is formed on the inner circumferential surface of the case 21 on the X1 side. In the illustrated example, the bearing portion 211 is a through-hole, but may be a recessed portion that is not a through-hole.

The bearing portion 212 is the portion of the first holding member 3 that holds the shaft portion 34, which will be described later. As illustrated in FIG. 4, the bearing portion 212 is formed on the inner circumferential surface of the case 21 on the X2 side. In the illustrated example, the bearing portion 212 is a through-hole, but may be a recessed portion that is not a through-hole.

The bearing portion 213 is the portion of the second holding member 4 that holds the shaft portion 42, which will be described later. As illustrated in FIG. 3, the bearing portion 213 is formed on the inner circumferential surface of the case 21 on the Y1 side. In the illustrated example, the bearing portion 213 is a through-hole, but may be a recessed portion that is not a through-hole.

The bearing portion 214 is a portion of the second holding member 4 that houses the shaft portion 44, which will be described later. As illustrated in FIG. 3, the bearing portion 214 is formed on the inner circumferential surface of the case 21 on the Y2 side. Unlike the bearing portions 211 to 213, the bearing portion 214 does not have portions that support the shaft portion 44 from beneath.

The frame 22 is a member that constitutes the bottom surface of the housing 2. The frame 22 is formed of, for example, a metal. The frame 22 has a bottom surface portion 221 and a support portion 222 as illustrated in FIG. 4.

The bottom surface portion 221 constitutes the bottom surface of the housing 2. The bottom surface portion 221 is a substantially rectangular flat plate and secures the case 21 to the upper surface.

The support portion 222 is the portion which supports the side of the case 21. The support portion 222 is formed to extend upwardly at the edges of the X1 and X2 sides in the bottom surface portion 221. The support portion 222 and the side surfaces of the case 21 contact each other, so that the misalignment in the X-direction of the case 21 is suppressed. At least one of the Y1 and Y2 sides of the bottom surface portion 221 may be provided with the support portion 222.

A guide portion 223 is provided on the upper surface of the bottom surface portion 221 of the frame 22. The guide portion 223 guides the sliding motion of the actuator 61, which will be described later. The guide portion 223 is formed of, for example, a resin. The guide portion 223 is annular and secured to the upper surface of the bottom surface portion 221 so as to surround the bottom portion 612 of the actuator 61. The guide portion 223 is formed so that the diameter of the inner circumference becomes larger toward the upper portion.

It should be noted that the configuration of the housing 2 is not limited to the example illustrated in the drawings. The housing 2 can be any configuration that can house each configuration of the operation device 100.

The first holding member 3 is a member that holds the operation member 5 tiltable in the Y-direction (the first direction). The first holding member 3 is formed of, for example, a resin. The first holding member 3 is held in the case 21 so that the first holding member 3 can be rotated with the X-direction as the axis of rotation. The rotation corresponds to a rotation where the rotation angle is limited to a predetermined range. As illustrated in FIG. 2, the first holding member 3 includes a holding portion 31, shaft portions 32 and 34, stopper portions 33 and 35, and a driving portion 36.

The holding portion 31 is a portion for holding the operation member 5. The holding portion 31 is formed in a spherical shape with an open center covering the upper surface of the base portion 52, which will be described later, of the operation member 5, and the shaft portion 51, which will be described later, is inserted into the opening portion. The holding portion 31 abuts on the Y1 side and the Y2 side of the operation member 5 and is formed so as to be separated from the X1 side and the X2 side of the operation member 5.

The shaft portion 32 is a rotation axis of the first holding member 3 extending from the X1 side of the holding portion 31 to the X1-direction. The shaft portion 32 is positioned opposite to the shaft portion 34. The shaft portion 32 is rotatably held by the bearing portion 211 of the case 21 (see FIG. 4).

The stopper portion 33 regulates the movement of the first holding member 3 in the X1 direction. The stopper portion 33 extends from the X1 side of the holding portion 31 in the X1 direction and is formed so that the end portion of the X1 side abuts the inner circumferential surface of the X1 side of the case 21. The stopper portion 33 abuts the inner circumferential surface of the case 21, so that the movement of the first holding member 3 in the X1 direction is regulated.

The shaft portion 34 is a rotation axis of the first holding member 3 extending from the X2 side of the holding portion 31 to the X2-direction. The shaft portion 34 is positioned opposite to the shaft portion 32. The shaft portion 34 is rotatably held by a bearing portion 212 of the case 21 (see FIG. 4).

The stopper portion 35 regulates the movement of the first holding member 3 in the X2-direction. The stopper portion 35 extends from the X2 side of the holding portion 31 in the X2-direction and is formed so that the end of the X2 side abuts the inner circumferential surface of the X2 side of the case 21. When the stopper portion 35 and the inner circumferential surface of the case 21 contact each other, the movement of the first holding member 3 in the X2-direction is regulated.

The driving portion 36 is a portion that drives the first detecting member 71, which will be described later. The driving portion 36 extends downwardly from the X1 side of the holding portion 31 and is formed to sandwich a protruding portion 712 described later of the first detecting member 71 from the Y1 side and the Y2 side.

As a result of the above-described configuration, the first holding member 3 is rotatably held in the case 21 so that the first holding member 3 can be rotated with the X-direction as the axis of rotation. The first holding member 3 sandwiches the operation member 5 from the Y1 side and the Y2 side. Therefore, when the operation member 5 is tilted in the Y-direction, the first holding member 3 rotates with the operation member 5 in the Y-direction. That is, the first holding member 3 holds the operation member 5 tiltable in the Y-direction. When the operation member 5 is tilted in the X-direction, the operation member 5 moves inside the opening portion of the holding portion 31. Therefore, the first holding member 3 does not prevent the operation member 5 from tilting in the X-direction.

The configuration of the first holding member 3 is not limited to the example illustrated in the drawings. The first holding member 3 can be any configuration capable of holding the operation member 5 tiltable in the Y-direction. Further, according to the present embodiment, the operation device 100 may be configured not to include the first holding member 3. In this case, the operation member 5 can only be tilted in the X-direction.

The second holding member 4 is a member that holds the operation member 5 tiltable in the X-direction (the second direction). The second holding member 4 is formed of, for example, a resin. The second holding member 4 is held in the case 21 so that the second holding member 4 can be rotated with the Y-direction as the axis of rotation. As illustrated in FIG. 2, the second holding member 4 includes holding portions 41A and 41B, shaft portions 42 and 44, and a driving portion 43.

The holding portion 41A is a portion for sandwiching the operation member 5. The holding portion 41A is formed into a spherical shape having an opening center that covers the X1 side of the base portion 52, which will be described later, in the operation member 5. A convex portion 55, which will be described later, of the operation member 5 is inserted into the opening portion (see FIG. 4).

The holding portion 41B is a portion for sandwiching the operation member 5. The holding portion 41B is formed into a spherical shape having an opening center that covers the X2 side of the base portion 52, which will be described later, in the operation member 5. A convex portion 56, which will be described later, of the operation member 5 is inserted into the opening portion (see FIG. 4).

The holding portions 41A and 41B are integrally formed and connected on the Y1 side and the Y2 side. Hereinafter, a spherical portion formed by the holding portions 41A and 41B is referred to as the holding portion 41. The holding portion 41 abuts on the X1 side and the X2 side of the operation member 5 and is formed so as to be separated from the Y1 side and the Y2 side of the operation member 5.

The shaft portion 42 is a rotation axis of the second holding member 4 extending from the Y1 side of the holding portion 41 to the Y1-direction. The shaft portion 42 is positioned opposite to the shaft portion 44. The shaft portion 42 is rotatably held by a bearing portion 213 of the case 21 (see FIG. 3).

The driving portion 43 drives the second detecting member 72, which will be described later. The driving portion 43 extends downwardly from the Y1 side of the holding portion 41 and is formed to sandwich a protruding portion 722, which will be described later, of the second detecting member 72 from the X1 side and the X2 side.

The shaft portion 44 is a rotation axis of the second holding member 4 extending from the Y2 side of the holding portion 41 to the Y2-direction. The shaft portion 44 is positioned opposite to the shaft portion 42. The shaft portion 44 is rotatably housed by a bearing portion 214 of the case 21 and is supported from below by a third detecting member 73, which will be described below (see FIG. 3). Thus, the shaft portion 44 is rotatably held. The end portion of the Y2 side in the shaft portion 44 and the inner circumferential surface of the bearing portion 214 contact each other, so that the movement of the second holding member 4 in the Y2-direction is regulated.

As a result of the above-described configuration, the second holding member 4 is held in the case 21 so that the second holding member 4 can be rotated with the Y-direction as the axis of rotation. The second holding member 4 sandwiches the operation member 5 from the X1 side and the X2 side. Therefore, when the operation member 5 is tilted in the X-direction, the second holding member 4 rotates with the operation member 5 in the X-direction. That is, the second holding member 4 holds the operation member 5 tiltable in the X-direction. When the operation member 5 is tilted in the Y-direction, the operation member 5 moves inside the opening portion (between the Y1 side and the Y2 side) of the holding portion 41. Therefore, the second holding member 4 does not prevent the operation member 5 from tilting in the Y-direction.

It should be noted that the configuration of the second holding member 4 is not limited to the example illustrated in the drawings. The second holding member 4 can be any configuration capable of holding the operation member 5 tiltable in the X-direction. Further, according to the present embodiment, the operation device 100 may be configured not to include the second holding member 4. In this case, the operation member 5 can only be tilted in the Y-direction.

The operation member 5 is a member that receives an operation from a user through the operation knob 1. The operation member 5 is tiltably held in the Y-direction by the first holding member 3 and is tiltably held in the X-direction by the second holding member 4. The operation member 5 is connected to the lower portion of the operation knob 1 and tilts in the X-direction and the Y-direction in accordance with the user's operation of the operation knob 1. The operation member 5 is formed as a hollow cylindrical shape and houses the returning mechanism 6 inside. The operation member 5 is held by the first holding member 3 and the second holding member 4 so that the axial direction is in the Z-direction at the initial position. The initial position of the operation member 5 is the non-operation position of the operation member 5. The configuration of the operation member 5 will be described below with reference to the state at the time of non-operation. The operation member 5 has a shaft portion 51, a base portion 52, convex portions 55 and 56, and a step portion 57.

The shaft portion 51 is a cylindrical portion extending in the axial direction. The shaft portion 51 is formed to extend from the base portion 52 in the Z1-direction and is inserted into an opening portion of the first holding member 3 and the second holding member 4 to expose the shaft portion 51 upwardly from the housing 2. The upper end of the shaft portion 51 is inserted into the connection portion 12 of the operation knob 1. Thus, the operation knob 1 and the operation member 5 are connected.

A recessed portion 53 which extends in the axial direction is formed on the inner circumferential surface of the shaft portion 51. The recessed portion 53 fits with the protruding portion 622 of the slide member 62, which will be described later, and thereby fixes the slide member 62 in the circumferential direction with respect to the operation member 5. In other words, the recessed portion 53 is fitted with the protruding portion 622 to prevent the slide member 62 from rotating with respect to the operating member 5. In the illustrated example, the operation member 5 has two recessed portions 53, but may have one recessed portion 53 or three or more recessed portions 53.

The inner circumferential surface of the shaft portion 51 is provided with a retaining portion 54 that has a downward surface perpendicular to the axial direction. The retaining portion 54 contacts the lower end of the slide member 62, which will be described later, to prevent the slide member 62 from exiting upwardly from the operation member 5.

The base portion 52 is a portion substantially spherical in shape formed at the lower end of the shaft portion 51. The base portion 52 is housed inside the housing 2 and is sandwiched by the holding portion 31 of the first holding member 3 and the holding portion 41 of the second holding member 4.

The convex portion 55 protrudes from the X1 side of the base portion 52 in the X1-direction. The convex portion 55 is inserted into an opening portion of the holding portion 41A. The convex portion 55 is formed so as to be rotatable in the Y-direction inside the opening portion of the holding portion 41A.

The convex portion 56 protrudes from the X2 side of the base portion 52 in the X2-direction. The convex portion 56 is inserted into an opening portion of the holding portion 41B. The convex portion 56 is formed so as to be rotatable in the Y-direction inside the opening portion of the holding portion 41B.

The step portion 57 is a portion having a step shape in the axial direction formed on the inner circumferential surface of the base portion 52 for adjusting the axial height (position in the Z-direction) of a cam member 63, which will be described later. The step portion 57 has three steps 58A to 58D, respectively. Hereinafter, when the steps 58A to 58D are not distinguished, the steps are referred to as steps 58.

The steps 58 protrude inwardly from the inner circumferential surface of the base portion 52 and have a lower surface. Each step 58 is arranged at equal intervals (every 30°) in the circumferential direction of the operation member 5 along the inner circumferential surface of the base portion 52. The lower surface of the steps 58 is tilted in the axial direction (in the Z-direction) with respect to the circumferential direction (the XY plane) of the operation member 5. The steps 58 are formed so that a height in the axial direction from the bottom of the operation member 5 becomes higher along a rotational direction R (in the direction of the arrow R in FIG. 5) of the cam member 63. Hereinafter, a height H in the axial direction from the lower end of the operation member 5 to the center of the lower surface of the steps 58 is referred to as the height H in the axial direction of the steps 58.

The steps 58A to 58D are formed so that each width in the circumferential direction is equal, a height HA in the axial direction of the step 58A is the highest, a height HB in the axial direction of the step 58B is the second highest, a height HC in the axial direction of the step 58C is the third highest, and a height HD in the axial direction of the step 58D is the fourth highest (the lowest). The steps 58A to 58D are arranged in this order along the rotational direction R. As a result, three steps 58A are arranged at equal intervals (every 120°) in the circumferential direction of the operation member 5, three steps 58B are arranged at equal intervals (every 120°) in the circumferential direction of the operation member 5, three steps 58C are arranged at equal intervals (every 120°) in the circumferential direction of the operation member 5, and three steps 58D are arranged at equal intervals (every 120°) in the circumferential direction of the operation member 5.

By configuring the steps 58A to 58D in this manner, a step portion 57 having three step shapes of four steps in the circumferential direction is formed. The height of the cam member 63 in the axial direction is adjusted in three steps by the step portion 57.

The configuration of the step portion 57 is not limited to the example illustrated in the drawings. The step portion 57 may be any configuration capable of adjusting a height of the cam member 63 in the axial direction. When the height of the cam member 63 in the axial direction is adjusted to N stages, the step portion 57 may be configured so as to have the step shape of (N+1) stages. Further, the shapes of the step portion 57 are not limited to three.

The configuration of the operation member 5 is not limited to the example illustrated in the drawings. The operation member 5 can be any configuration in which an operation from a user can be received through the operation knob 1 and the returning mechanism 6 can be housed inside.

The returning mechanism 6 will be described later.

The detecting mechanism 7 is a mechanism for detecting the operation of the operation member 5 (the operation knob 1) by a user. The detecting mechanism 7 includes a first detecting member 71, a second detecting member 72, and a third detecting member 73.

The first detecting member 71 is a member for detecting a tilting operation of the operation member 5 in the Y-direction. The first detecting member 71 has a holding portion 711, a protruding portion 712, and a movable contact 713.

The holding portion 711 is the portion holding the movable contact 713. The holding portion 711 is formed of, for example, a resin. The holding portion 711 is formed to extend in the Y-direction and secures the movable contact 713 on the lower surface of the holding portion 711. The holding portion 711 is arranged on the substrate 8.

The protruding portion 712 protrudes from the X2 side of the holding portion 711 in the X2-direction. The protruding portion 712 is formed of, for example, a resin. The protruding portion 712 is sandwiched from the Y1 side and the Y2 side by the driving portion 36. The holding portion 711 is arranged so that the driving portion 36 can sandwich the protruding portion 712.

The movable contact 713 is a contact point secured on the lower surface of the holding portion 711. The movable contact 713 is formed of, for example, a metal. The movable contact 713 is formed so that a portion thereof is in contact with the upper surface of the substrate 8.

When the operation member 5 is tilted in the Y-direction, the first holding member 3 rotates in the Y-direction in accordance with the tilting of the operation member 5, and the driving portion 36 rotates in the Y-direction. When the driving portion 36 rotates in the Y-direction, the protruding portion 712 sandwiched in the driving portion 36 is driven in the Y-direction, and the holding portion 711 is driven in the Y-direction. When the holding portion 711 is driven in the Y-direction, the movable contact 713 held by the holding portion 711 slides on the substrate 8 in the Y-direction. That is, the movable contact 713 slides in the Y-direction in accordance with the tilting of the operation member 5 in the Y-direction. Accordingly, the tilting of the operation member 5 in the Y-direction can be detected by detecting the position of the movable contact 713 by a circuit provided on the upper surface of the substrate 8.

The second detecting member 72 is a member for detecting a tilting operation of the operation member 5 in the X-direction. The second detecting member 72 has a holding portion 721, a protruding portion 722, and a movable contact 723.

The holding portion 721 is the portion holding the movable contact 723. The holding portion 721 is formed of, for example, a resin. The holding portion 721 is formed to extend in the X-direction and secures the movable contact 723 on the lower surface of the holding portion 721. The holding portion 721 is arranged on the substrate 8.

The protruding portion 722 protrudes from the Y2 side of the holding portion 721 in the Y2-direction. The protruding portion 722 is formed of, for example, a resin. The protruding portion 722 is sandwiched from the X1 side and the X2 side by the driving portion 43. The holding portion 721 is arranged so that the driving portion 43 can sandwich the protruding portion 722.

The movable contact 723 is a contact point secured on the lower surface of the holding portion 721. The movable contact 723 is formed of, for example, a metal. The movable contact 723 is formed so that a portion thereof is in contact with the upper surface of the substrate 8.

When the operation member 5 is tilted in the X-direction, the second holding member 4 rotates in the X-direction in accordance with the tilting of the operation member 5, and the driving portion 43 rotates in the X-direction. When the driving portion 43 is rotated in the X-direction, the protruding portion 722 sandwiched in the driving portion 43 is driven in the X-direction, and the holding portion 721 is driven in the X-direction. When the holding portion 721 is driven in the X-direction, the movable contact 723 held by the holding portion 721 slides on the substrate 8 in the X-direction. That is, the movable contact 723 slides in the X-direction in accordance with the tilting of the operation member 5 in the X-direction. Accordingly, the tilting of the operation member 5 in the X-direction can be detected by detecting the position of the movable contact 723 by the circuit provided on the upper surface of the substrate 8.

The third detecting member 73 is a member for detecting a pressing operation in the Z-direction (axial direction) of the operation member 5. The third detecting member 73 is formed of, for example, a resin. The third detecting member 73 has a support portion 731 and a pressing portion 732.

The support portion 731 is a portion that supports the shaft portion 44 from beneath. The support portion 731 is disposed under the shaft portion 44. The shaft portion 44 rotates over the support portion 731.

The pressing portion 732 is a portion which presses a movable contact 83, which will be discussed later. The pressing portion 732 is disposed on the movable contact 83. When the operation member 5 is pressed in the axial direction, the shaft portion 44 moves downwardly, the third detecting member 73 moves downwardly, and the movable contact 83 is pressed. Accordingly, the pressing operation of the operation member 5 can be detected by detecting the pressing operation of the movable contact 83 by a circuit provided on the upper surface of the substrate 8.

The configuration of the detecting mechanism 7 is not limited to the example illustrated in the drawings. The detecting mechanism 7 can be any configuration in which tilting and pressing operations of the operation member 5 can be detected. In the embodiment, the operation device 100 may be configured not to include one or two of the first detecting member 71, the second detecting member 72, and the third detecting member 73. For example, when the first detecting member 71 is not provided, the operation device 100 can only detect tilting and pressing operations of the operation member 5 in the X-direction. For example, when the second detecting member 72 is not provided, the operation device 100 can detect only tilting and pressing operations of the operation member 5 in the Y-direction. For example, when the third detecting member 73 is not provided, the operation device 100 can detect only tilting operations of the operation member 5 in the X and Y-directions.

The substrate 8 is a printed substrate that includes a circuit for detecting the operation of the operation member 5 by a user. The substrate 8 is, for example, a flexible substrate. The substrate 8 is disposed on the bottom surface of the housing 2 (the bottom surface portion 221 of the frame 22), and the terminals are exposed to the exterior of the housing 2.

A circuit for detecting operation of the operation member 5 by a user is mounted on the upper surface of the substrate 8. Specifically, a fixed contact 81 is mounted on the sliding path of the movable contact 713 in the substrate 8 for detecting the position of the movable contact 713 in the Y-direction. On the sliding path of the movable contact 723 in the substrate 8, the fixed contact 82 is mounted for detecting the position of the movable contact 723 in the X-direction. In addition, the movable contact 83 for detecting the pressing operation of the operation member 5 and the fixed contact for detecting the pressing operation of the movable contact 83 are mounted on the portion corresponding to the pressing portion 732 in the substrate 8. The movable contact 83 is, for example, a metal contact, but is not limited thereto.

The configuration of the substrate 8 is not limited to the example illustrated in the drawings. The substrate 8 may be any configuration in which the operation of the operation member 5 by the user can be detected. For example, the substrate 8 may be a rigid substrate.

Next, a returning mechanism 6 will be described. The returning mechanism 6 is a mechanism for preloading the tilted operation member 5 toward the initial position and automatically returning the operation member 5 to the initial position. The returning mechanism 6 tilts with tilting of the operation member 5 and applies an actuation force toward the initial position to the operation member 5. The returning mechanism 6 includes a knocking mechanism for adjusting the actuation force to multiple stages. The returning mechanism 6 is arranged inside the cylindrical operation member 5. As illustrated in FIGS. 6 and 7, the returning mechanism 6 includes an actuator 61, a slide member 62, a cam member 63, a first elastic member 64, and a second elastic member 65.

The actuator 61 is an axle member that supports other configurations of the returning mechanism 6. The actuator 61 is formed of, for example, a resin. The actuator 61 has a shaft portion 611 and a bottom portion 612.

The shaft portion 611 extends from the upper surface of the bottom portion 612 in an axial direction (in the Z1-direction) of the operation member 5. The shaft portion 611 is inserted into the slide member 62, the cam member 63, the first elastic member 64, and the second elastic member 65. The shaft portion 611 serves as these axes. The shaft portion 611 is formed so that the upper portion 613 is thinner than the lower portion 614.

The bottom portion 612 is a disk-like portion that abuts the bottom surface of the housing 2 (the upper surface of the frame 22). The bottom portion 612 is formed at a lower end (one end) of shaft portion 611. The actuator 61 is positioned so that the bottom portion 612 is positioned at the center of a guide portion 223 when not operating. When the actuator 61 tilts along with the tilting of the operation member 5, the bottom portion 612 slides on the bottom surface of the housing 2 and on the inner circumferential surface of the guide portion 223 in accordance with the tilting of the actuator 61.

The configuration of the actuator 61 is not limited to the example illustrated in the drawings. The actuator 61 can be any configuration that can support other configurations of the returning mechanism 6 as an axis.

The slide member 62 is a member that rotates the cam member 63 in accordance with a pressing operation of a push button provided on the operation knob 1. The slide member 62 is formed of, for example, a resin. The slide member 62 is formed into a cylindrical shape extending in the axial direction with the upper end closed, and the upper end of the shaft portion 611 of the actuator 61 is inserted into the slide member 62. Thus, the slide member 62 is movably supported in the axial direction with respect to the operation member 5 and the actuator 61. The slide member 62 has a cylindrical portion 621, a protruding portion 622, a support portion 623, and a first cam surface 624.

The cylindrical portion 621 is a cylindrical portion extending in the axial direction in which the upper end of the cylindrical portion is closed. The inner diameter of the cylindrical portion 621 is formed to be slightly larger than the outer diameter of the upper portion 613 of the shaft portion 611 of the actuator 61. The outer diameter of the cylindrical portion 621 is formed to be slightly smaller than the inner diameter of the shaft portion 51 of the operation member 5. The cylindrical portion 621 is inserted into the shaft portion 611 of the actuator 61 and is inserted into the shaft portion 51 of the operation member 5 (see FIG. 4).

The lower end of the cylindrical portion 621 is formed so that the outer diameter is larger than the outer diameter of the other parts. The lower end of the slide member 62 abuts the retaining portion 54 formed on the inner circumferential surface of the operation member 5 when the returning mechanism 6 is inserted into the operation member 5, and prevents the sliding member 62 from coming out of the operation member 5 upwardly.

The protruding portion 622 is a portion protruding from the outer circumferential surface of the cylindrical portion 621 that is formed to extend in the axial direction. When the returning mechanism 6 is inserted into the operation member 5, the protruding portion 622 fits with the recessed portion 53 formed on the inner circumferential surface of the shaft portion 51 and fixes the slide member 62 in the circumferential direction with respect to the operation member 5. In other words, the protruding portion 622 fits the recessed portion 53 to prevent the slide member 62 from rotating with respect to the operation member 5. Accordingly, the protruding portion 622 is disposed in a position corresponding to the recessed portion 53. In the illustrated example, the slide member 62 has two protruding portions 622, but may have one protruding portion 622 or three or more protruding portions 622.

The support portion 623 is a downward plane perpendicular to the axial direction formed on the inner side of the cylindrical portion 621. The support portion 623 is formed by increasing the internal diameter of the lower portion of the cylindrical portion 621. The support portion 623 supports the upper end of the first elastic member 64.

The first cam surface 624 is a cam surface formed on the lower surface of the lower end of the cylindrical portion 621. The first cam surface 624 is formed by a plurality of protruding portions arranged on the outer periphery of the lower surface of the lower end in the cylindrical portion 621. Each protruding portion has the same shape and is formed in a substantially triangular shape projecting downwardly from the lower surface of the lower end in the cylindrical portion 621. The first cam surface 624 faces a second cam surface 634, which will be described later, in the cam member 63.

The configuration of the slide member 62 is not limited to the example illustrated in the drawings. The slide member 62 may be of any configuration capable of rotating the cam member 63 in accordance with a pressing operation of a push button provided on the operation knob 1.

The cam member 63 is a member that adjusts an actuation force applied to the operation member 5. The cam member 63 is formed of, for example, a resin. The cam member 63 is formed into a cylindrical shape extending in the axial direction, and a central portion of the shaft portion 611 of the actuator 61 is inserted into the cam member 63. Thus, the cam member 63 is movably supported in the axial direction with respect to the operation member 5 and the actuator 61. The cam member 63 rotates in a rotational direction R (in the direction of the arrow R of FIG. 6) each time the cam member 63 is pressed by the slide member 62. The cam member 63 has the cylindrical portion 631, the support portion 632, three protruding portions 633, and the second cam surface 634.

The cylindrical portion 631 is a portion extending to the axial direction. The inner diameter of the cylindrical portion 631 is formed to be slightly larger than the outer diameter of the lower portion 614 of the shaft portion 611 of the actuator 61. The outer diameter of the cylindrical portion 631 is substantially equal to the outer diameter of the lower end of the slide member 62 and is formed to be smaller than the inner diameter of the second elastic member 65. The cylindrical portion 631 is inserted into the shaft portion 611 of the actuator 61 and is inserted into the shaft portion 51 of the operation member 5 and the second elastic member 65 (see FIG. 4).

The upper end of the cylindrical portion 631 is formed so that the inner diameter is smaller than the inner diameter of the other portions and is slightly larger than the outer diameter of the upper portion 613 of the shaft portion 611 of the actuator 61. The upper end of the cylindrical portion 631 supports the lower end of the first elastic member 64. Further, the upper end of the cylindrical portion 631 abuts the lower portion 614 of the shaft portion 611 of the actuator 61, thereby limiting the movement of the cam member 63 downward with respect to the actuator 61.

The support portion 632 is a downward plane perpendicular to the axial direction formed on the outer circumferential surface of the cylindrical portion 631. The support portion 632 is formed by increasing the outer diameter of a portion of the cylindrical portion 631. The support portion 632 supports the upper end of the second elastic member 65.

The protruding portion 633 protrudes outward from the outer circumferential surface of the cylindrical portion 631. In the illustrated example, a protruding portion 633 is provided in the center portion of the cylindrical portion 631 having a large outer diameter, but may be provided at any position above the support portion 632. The three protruding portions 633 have the same shape and are arranged on the outer circumferential surface of the cylindrical portion 631 in the axial direction at the same height and at equal circumferential intervals.

The protruding portion 633 is formed so that the width in the circumferential direction is equal to that of the step 58. The protruding portion 633 also has an upper surface. The upper surface of the protruding portion 633 is tilted in the axial direction (in the Z-direction) with respect to the circumferential direction (in the XY plane) and is formed along the rotational direction R so as to have a high height in the axial direction from the lower end of the actuator 61. More specifically, the upper surface of the protruding portion 633 is formed parallel to the lower surface of the step 58. Hereinafter, the height h in the axial direction from the lower end of the actuator 61 (the bottom portion 612) to the center of the upper surface of the protruding portion 633 is referred to as the height h in the axial direction of the cam member 63.

With such a configuration, the cam member 63 is fixed in the circumferential direction in a state such that the three protruding portions 633 abut the three steps 58A, the three steps 58B, or the three steps 58C, respectively, when not operating. The height h of the cam member 63 in the axial direction is a height corresponding to the height HA (a height corresponding to the steps 58A) when the protruding portion 633 abuts the steps 58A, a height corresponding to the height HB (a height corresponding to the steps 58B) when the protruding portion 633 abuts the steps 58B, and a height corresponding to the height HC (a height corresponding to the steps 58C) when the protruding portion 633 abuts the steps 58C. That is, the height h in the axial direction of the cam member 63 is one of three heights corresponding to the height HA to HC.

The second cam surface 634 is a cam surface formed on the upper surface of the upper end of the cylindrical portion 631. The second cam surface 634 is formed by a plurality of protruding portions arranged on the outer periphery of the upper surface of the upper end in the cylindrical portion 631. Each protruding portion has the same shape and is formed in a substantially triangular shape projecting upwardly from the upper surface of the upper end in the cylindrical portion 631. The second cam surface 634 faces the first cam surface 624.

More specifically, as illustrated in FIG. 6, the second cam surface 634 is formed so that the apex of the convex portion of the first cam surface 624 faces the surface opposite to the rotational direction R of the convex portion of the second cam surface 634 when not operating. In other words, the second cam surface 634 is formed so that the apex of the convex portion of the second cam surface 634 faces the surface on the rotational direction R side of the convex portion of the first cam surface 624.

With such a configuration, when the slide member 62 is pressed, the first cam surface 624 and the second cam surface 634 contact each other, the second cam surface 634 is preloaded in the rotational direction R by the first cam surface 624, and the cam member 63 rotates in the rotational direction R.

The configuration of the cam member 63 is not limited to the example illustrated in the drawings. The cam member 63 may be of any structure capable of adjusting the actuation force applied to the operation member 5.

The first elastic member 64 is an elastic member that applies an upward preloading force to the slide member 62. The first elastic member 64 is, for example, a metal compression coil spring, but is not limited thereto. The first elastic member 64 is disposed between the slide member 62 and the cam member 63. The upper portion 613 of the shaft portion 611 in the actuator 61 is inserted into the first elastic member 64, and inserted into the cylindrical portion 621 of the slide member 62. The upper end of the first elastic member 64 is supported by the support portion 623 of the slide member 62 and the lower end of the first elastic member 64 is supported by the upper surface of the upper end of the cam member 63.

The configuration of the first elastic member 64 is not limited to the examples illustrated in the drawings. The first elastic member 64 can be of any configuration that applies an upward preloading force to the slide member 62.

The second elastic member 65 is an elastic member that applies an upward preloading force to the cam member 63. The second elastic member 65 is, for example, a metal compression coil spring, but is not limited thereto. The second elastic member 65 is disposed between the cam member 63 and the bottom portion 612 of the actuator 61, and the cylindrical portion 631 of the cam member 63 and the shaft portion 611 of the actuator 611 are inserted into the second elastic member 65. The upper end of the second elastic member 65 is supported by the support portion 632 of the cam member 63 and the lower end of the second elastic member 65 is supported by the upper surface of the bottom portion 612 of the actuator 61.

The configuration of the second elastic member 65 is not limited to the example illustrated in the drawings. The second elastic member 65 can be of any configuration that applies an upward preloading force to the cam member 63.

Next, an operation of the operation device 100 according to the present embodiment will be described.

Figure 8:
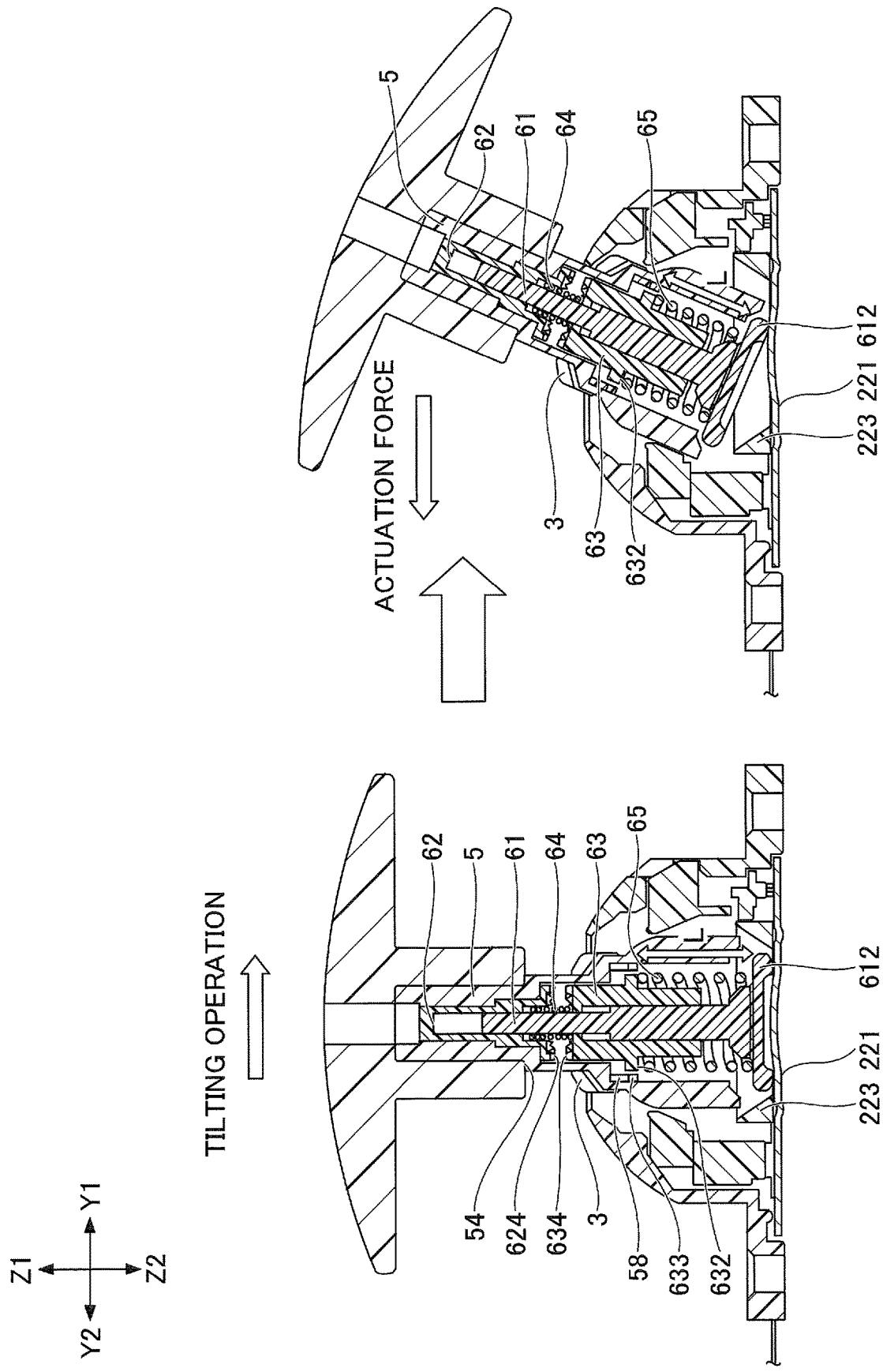
FIG. 8 is a cross-sectional view illustrating a state of the operation device before and after a tilting operation of the operation member.

First, an operation of the operation device 100 when the operation of the operation member 5 is tilted will be described with reference to FIG. 8. FIG. 8 is a cross-sectional view illustrating the state of the operation device 100 before and after the tilting operation of the operation member 5. The left diagram of FIG. 8 illustrates the state before the tilting operation of the operation device 100, and the right diagram of FIG. 8 illustrates the state after the tilting operation of the operation device 100.

As illustrated in the left diagram in FIG. 8, the operation member 5 is positioned in the initial position before tilting operation. At this time, the axial direction of the operation member 5 is coincident with the Z-direction. The lower surface of the bottom portion 612 of the actuator 61 abuts the bottom surface portion 221 of the frame 22. The slide member 62 is preloaded towards the Z1 side in the axial direction by the first elastic member 64, and the lower end abuts the retaining portion 54 of the operation member 5, and the first cam surface 624 is separated from the second cam surface 634. The cam member 63 is preloaded toward the Z1 side in the axial direction by the second elastic member 65, and the upper surface of the protruding portion 633 abuts the lower surface of the step 58 of the operation member 5.

When a user tilts the operation member 5 in the Y1-direction through the operation knob 1, the operation member 5 is tilted in the Y1-direction with the shaft portions 32 and 34 of the first holding member 3 as the axes. In addition, when the operation member 5 is tilted, the returning mechanism 6 is tilted in the Y1-direction. The relative positions of the operation member 5, the slide member 62, and the cam member 63 are maintained even when the operation member 5 is tilted.

Meanwhile, the relative positional relationship between the operation member 5 and the actuator 61 changes when the operation member 5 is tilted. Specifically, when the operation member 5 tilts and the returning mechanism 6 tilts, the Y1 side of the bottom portion 612 of the actuator 61 slides in the Y2-direction on the bottom surface portion 221 of the frame 22, as illustrated in the right diagram of FIG. 8. The Y2 side of the bottom portion 612 of the actuator 61 slides on the bottom surface portion 221 of the frame 22 in the Y2-direction, and then slides on the inner circumferential surface of the guide portion 223 to separate from the bottom surface portion 221. As a result, the actuator 61 is pushed inside the operation member 5. In other words, the actuator 61 moves to the Z1 side in the axial direction with respect to the operation member 5.

Accordingly, the length L in the axial direction from the support portion 632 of the cam member 63 to the upper surface of the bottom portion 612 of the actuator 61 shortens. That is, the length L of the second elastic member 65 shortens. When the second elastic member 65 becomes shorter, the preloading force in the axial direction by the second elastic member 65 becomes larger, and an actuation force in the Y2-direction is applied to the operation member 5.

The actuation force depends on the length L of the second elastic member 65. The longer the length L (the higher the height h), the smaller the preloading force by the second elastic member 65, and thus the actuation force (a returning force) is reduced. The shorter the length L (the lower the height h), the greater the preloading force by the second elastic member 65, so that the actuation force increases. Accordingly, the greater the operation member 5 is tilted, the greater the operating force becomes.

When a user releases the finger from the operation knob 1 while the operation member 5 is tilted, the operation member 5 is tilted in the Y2-direction by the actuation force. The tilting of the operation member 5 in the Y2-direction stops at the initial position because the actuation force is 0 at the initial position. As a result, the operation member 5 automatically returns to its initial position when the user releases the finger from the operation knob 1.

As described above, the returning mechanism 6 can automatically return the operation member 5 tilted in the Y1-direction to the initial position. The same applies to the case in which the operation member 5 is tilted in another direction (not only in the Y2, X1, and X2-directions but also in all directions including the direction between the X-direction and the Y-direction). Accordingly, according to the present embodiment, the returning mechanism 6 can automatically return the tilted operation member 5 to the initial position.

Next, an operation of the operation device 100 when operating a push button will be described with reference to FIGS. 9 and 10.

Figure 9:
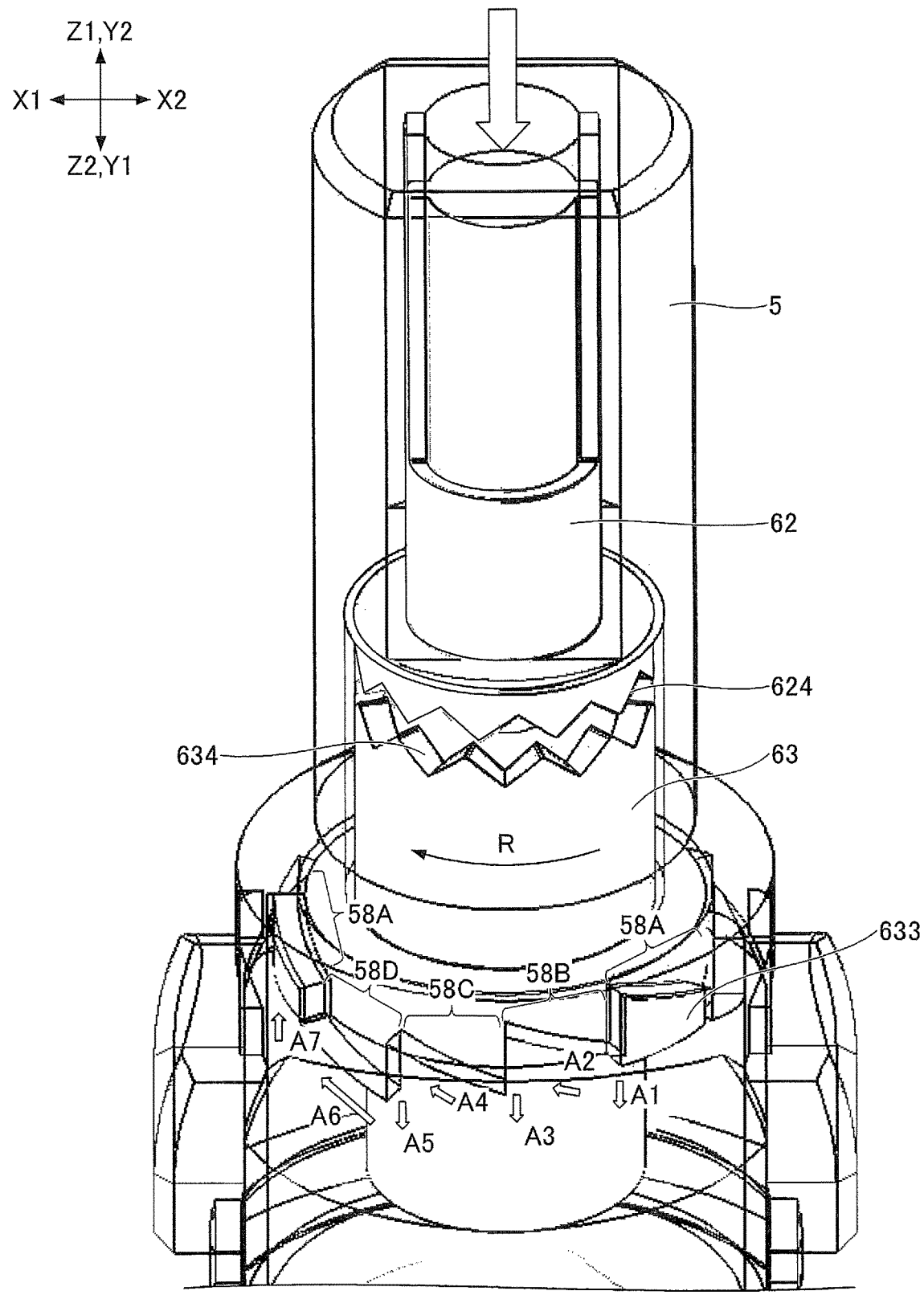
FIG. 9 is an enlarged view illustrating the operation of the returning mechanism when a push-button is pressed.

FIG. 9 is an enlarged view illustrating an operation of the returning mechanism 6 when operating a push button. In the example of FIG. 9, the operation knob 1 is omitted and the operation member 5 is transparently displayed. The protruding portion 633 of the cam member 63 abuts the step 58A of the operation member 5.

Figure 10:
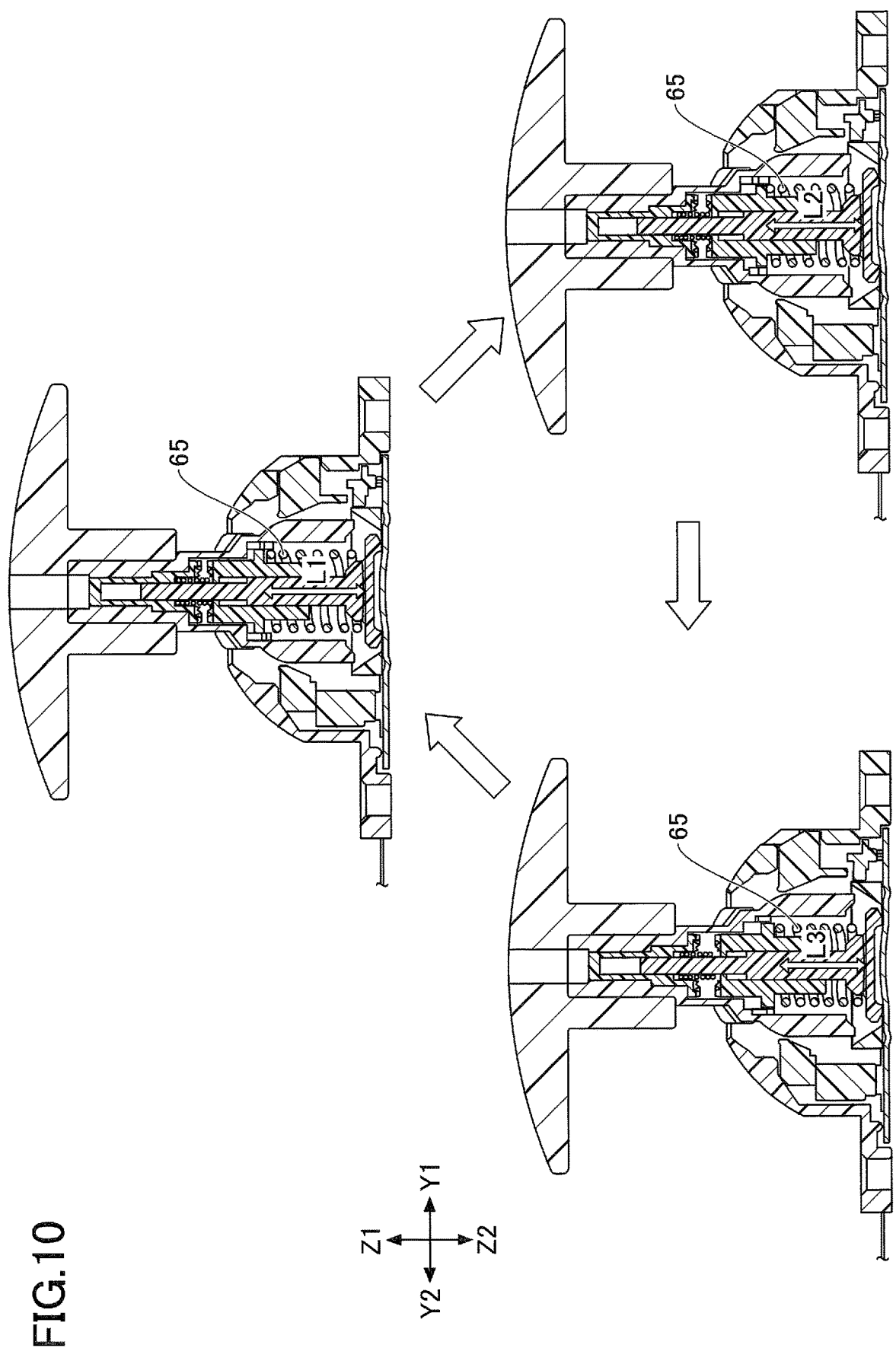
FIG. 10 is a cross-sectional view illustrating a change of state of the operation device by pressing the push-button.

FIG. 10 is a cross-sectional view illustrating a state change of the operation device 100 by pressing a push button. The upper view of FIG. 10 illustrates the operation device 100 in which the protruding portion 633 abuts the step 58A. The right view of FIG. 10 illustrates the operation device 100 in which the protruding portion 633 abuts the step 58B. The left view of FIG. 10 illustrates the operation device 100 in which the protruding portion 633 abuts the step 58C.

As illustrated in FIG. 9, when not operating the push button, the first cam surface 624 and the second cam surface 634 are separated. The upper surface of the protruding portion 633 abuts the lower surface of the step 58A, and the side surface of the protruding portion 633 abuts the side surface of the step 58B. Thus, the cam member 63 is fixed in the axial and circumferential directions with respect to the operation member 5.

At this time, as described above, the height h of the cam member 63 in the axial direction is the height corresponding to the height HA in the axial direction of the step 58A (the height corresponding to the step 58A). Accordingly, as illustrated in the upper diagram of FIG. 10, the length L of the second elastic member 65 is a length L1 corresponding to the height HA of the step 58A in the axial direction (see the upper diagram in FIG. 10).

In this state, when the user presses the push button, the push button presses the slide member 62 downward (on the Z2 side in the axial direction) and moves the slide member 62 downward. As the slide member 62 moves downwardly, the first cam surface 624 and the second cam surface 634 contact each other, and the slide member 62 presses the cam member 63 downwardly. When the first cam surface 624 and the second cam surface 634 contact each other, the cam member 63 is preloaded in the rotational direction R, but at this point, the cam member 63 does not rotate because the side of the protruding portion 633 and the side of the step 58B contact each other. Thus, the cam member 63 pressed by the slide member 62 moves downwardly (arrow A1 in FIG. 9).

As the cam member 63 moves downward by the height in the axial direction (difference between the height HA and the height HB) of the side of the step 58B, the side of the protruding portion 633 and the side of the step 58B do not contact each other. Therefore, the cam member 63 preloaded in the rotational direction R rotates in the rotational direction R along the lower surface of the step 58B (arrow A2 in FIG. 9). When the side of the cam member 63 and the side of the steps 58C come into contact, the rotation of the cam member 63 stops. Thereafter, when the user releases the finger from the push button, the slide member 62 is pressed upwardly (on the Z1 side in the axial direction) by the first elastic member 64 and moves upwardly until the lower end abuts the retaining portion 54 of the operation member 5.

As described above, when the user presses the push button once, the state of the operation device 100 is changed from the state of the upper diagram of FIG. 10 in which the protruding portion 633 and the step 58A contact each other to the state of the right diagram of FIG. 10 in which the protruding portion 633 and the step 58B contact each other.

At this time, as described above, the height h of the cam member 63 in the axial direction is a height corresponding to the height HB of the step 58B (a height corresponding to the step 58B). Accordingly, as illustrated in the right diagram in FIG. 10, the length L of the second elastic member 65 is a length L2 corresponding to the height HB of the step 58B in the axial direction (see the right diagram in FIG. 10). The length L2 is shorter than the length L1 by the difference between the height HA and the height HB.

In this state, when the user presses the push button, the push button presses the slide member 62 downward (on the Z2 side in the axial direction) and moves the slide member 62 downward. When the slide member 62 moves downwardly, the first cam surface 624 and the second cam surface 634 contact each other, and the slide member 62 presses the cam member 63 downwardly. When the first cam surface 624 and the second cam surface 634 contact each other, the cam member 63 is preloaded in the rotational direction R, but at this point, the cam member 63 does not rotate because the side of the protruding portion 633 and the side of the step 58C contact each other. Thus, the cam member 63 pressed by the slide member 62 moves downward (arrow A3 in FIG. 9).

As the cam member 63 moves downward by the height in the axial direction (difference between the height HB and the height HC) of the side of the step 58B, the side of the protruding portion 633 and the side of the step 58B do not contact each other. Therefore, the cam member 63 preloaded in the rotational direction R rotates in the rotational direction R along the lower surface of the step 58C (arrow A4 in FIG. 9). When the side of the cam member 63 and the side of the steps 58D come into contact, the rotation of the cam member 63 stops. Thereafter, when the user releases the finger from the push button, the slide member 62 is pressed upwardly (on the Z1 side in the axial direction) by the first elastic member 64 and moves upwardly until the lower end abuts the retaining portion 54 of the operation member 5.

As described above, when the user presses the push button once, the state of the operation device 100 is changed from the state of the right diagram in FIG. 10 in which the protruding portion 633 and the step 58B contact each other to the state of the left diagram in FIG. 10 in which the protruding portion 633 and the step 58C contact each other.

At this time, as described above, the height h of the cam member 63 in the axial direction is a height corresponding to the height HC of the step 58C in the axial direction (a height corresponding to the step 58C). Accordingly, as illustrated in the left diagram in FIG. 10, the length L of the second elastic member 65 is a length L3 corresponding to the height HC of the step 58C in the axial direction (see the left diagram in FIG. 10). The length L3 is shorter than the length L2 by the difference between the height HB and the height HC.

In this state, when the user presses the push button, the push button presses the slide member 62 downward (on the Z2 side in the axial direction) and moves the slide member 62 downward. When the slide member 62 moves downwardly, the first cam surface 624 and the second cam surface 634 contact each other, and the slide member 62 presses the cam member 63 downwardly. When the first cam surface 624 and the second cam surface 634 contact each other, the cam member 63 is preloaded in the rotational direction R, but at this point, the cam member 63 does not rotate because the side of the protruding portion 633 and the side of the step 58D contact each other. Thus, the cam member 63 pressed by the slide member 62 moves downward (arrow A5 in FIG. 9).

As the cam member 63 moves downward by the height in the axial direction (difference between the height HC and the height HD) of the side surface of the step 58C, the side of the protruding portion 633 and the side of the step 58B do not contact each other. Therefore, the cam member 63 preloaded in the rotational direction R rotates in the rotational direction R along the lower surface of the step 58D (arrow A6 in FIG. 9).

When the cam member 63 rotates until the upper surface of the protruding portion 633 and the lower surface of the step 58D do not contact each other, the cam member 63 is pressed upwardly by the second elastic member 65 and moves upwardly (arrows A7 in FIG. 9). Thus, the protruding portion 633 abuts the step 58A.

As described above, when the user presses the push button once, the state of the operation device 100 is changed from the state of the left diagram in FIG. 10 in which the protruding portion 633 and the step 58C contact each other to the state of the upper diagram in FIG. 10 in which the protruding portion 633 and the step 58A contact each other.

As described above, the returning mechanism 6 rotates the cam member 63 each time the user presses the push button, changes the height h in the axial direction of the cam member 63, and cyclically changes the length L of the second elastic member 65 in the order L1, L2, and L3 (L1>L2>L3). Such a mechanism of the returning mechanism 6 corresponds to a so-called knock mechanism, but is not limited thereto, and may be any mechanism by which the actuation force can be cyclically and gradually adjusted each time the push button is pressed by the user. The user can cyclically and gradually switch the force necessary to tilt the push button to a predetermined angle by pressing the push button.

As described above, the actuation force by the returning mechanism 6 depends on the length L of the second elastic member 65. Accordingly, according to this embodiment, the actuation force changes cyclically and gradually each time a user presses a push button. That is, according to the present embodiment, the user can cyclically and gradually adjust the actuation force of the returning mechanism 6 by pressing the push button.

The present invention is not limited to the above-described configurations, such as the configurations described in the above-described embodiments, including combinations with other elements. These points can be modified without departing from the spirit of the present invention, and can be appropriately determined according to the application form.

What is claimed is:

1. An operation device comprising:
    a housing;
    a tiltable cylindrical operation member having a step portion on an inner circumferential surface;
    a first holding member which is held by the housing and rotatable in a first direction in accordance with a tilting operation of the operation member;
    a first detecting portion for detecting a rotation of the first holding member; and
    a returning mechanism disposed inside the operation member to return the tilted operation member to an initial position,
    wherein the returning mechanism includes:
    an actuator having a shaft portion extending in an axial direction of the operation member, and a bottom portion that is formed at one end of the shaft portion and abuts a bottom surface of the housing;
        a slide member having a first cam surface at one end, wherein one end of the shaft portion is inserted into the slide member, the slide member being movable in the axial direction and fixed in a circumferential direction of the operation member;
        a cam member having a second cam surface at one end which faces the first cam surface, wherein a center portion of the shaft portion is inserted into the cam member, and the cam member is movable in the axial direction and fixed in the circumferential direction by the step portion, and wherein the cam member is preloaded in the circumferential direction by contact between the first cam surface and the second cam surface;
        a first elastic member disposed between the slide member and the cam member, and
        a second elastic member disposed between the cam member and the bottom portion.

2. The operation device according to claim 1, wherein the step portion includes two or more steps having a different height in the axial direction.

3. The operation device according to claim 2, wherein the cam member is fixed in the circumferential direction at the height in the axial direction corresponding to any of the steps of the step portion.

4. The operation device according to claim 1, wherein every time the cam member is pressed in the axial direction by the slide member, the height in the axial direction from the bottom portion changes.

5. The operation device according to claim 1, wherein an actuation force applied by the returning mechanism to the operation member increases as the height in the axial direction from the bottom portion to the cam member decreases.

6. The operation device according to claim 1, comprising a detecting member capable of detecting a pressing operation in the axial direction with respect to the operation member.

7. The operation device according to claim 1, further comprising:
    a second holding member which is held by the housing and rotatable in a second direction which is different from the first direction in accordance with the tilting operation of the operation member; and
    a second detecting portion for detecting a rotation of the second holding member.

* * * * *